United States Patent
Yoneda et al.

(10) Patent No.: US 6,739,076 B2
(45) Date of Patent: May 25, 2004

(54) ARTIFICIAL LEATHER SHOE AND ARTIFICIAL LEATHER SUITED THEREFOR

(75) Inventors: Hisao Yoneda, Okayama-Pref. (JP); Yoshiki Nobuto, Okayama-Pref. (JP); Susumu Kobayashi, Okayama-Pref. (JP); Mikihiro Matsui, Osaka-Pref. (JP); Tomo Yamada, Osaka-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 600 days.

(21) Appl. No.: 09/755,124

(22) Filed: Jan. 8, 2001

(65) Prior Publication Data

US 2001/0024709 A1 Sep. 27, 2001

(30) Foreign Application Priority Data

| Jan. 6, 2000 | (JP) | ........................................ | 2000-005730 |
| Jul. 17, 2000 | (JP) | ........................................ | 2000-215680 |
| Aug. 28, 2000 | (JP) | ........................................ | 2000-257603 |

(51) Int. Cl.$^7$ .......................... A43B 13/22; A43B 23/16; A43B 23/00
(52) U.S. Cl. ............................... 36/98; 36/45; 12/142 R
(58) Field of Search ............................ 12/142 R; 36/98, 36/45; 428/904, 91, 151, 198; 442/340, 345, 346, 351, 363, 392, 105

(56) References Cited

U.S. PATENT DOCUMENTS

| 4,287,629 A | | 9/1981 | Stalteri |
| 6,451,404 B1 | * | 9/2002 | Nobuto et al. ................. 428/91 |

FOREIGN PATENT DOCUMENTS

| GB | 2 306 392 | 5/1997 |

OTHER PUBLICATIONS

Derwent Publications, AN 1987–75316A, JP 53–104704, Sep. 12, 1978.

* cited by examiner

Primary Examiner—Elizabeth M. Cole
Assistant Examiner—Jeremy R Pierce
(74) Attorney, Agent, or Firm—Oblon, Spivak, McClelland, Maier & Neustadt, P.C.

(57) ABSTRACT

One embodiment of the invention relates to a laminated sheet material, including, in order:

(A) a substrate layer having an inner surface and at least a partially napped outer surface and including:
an entangled nonwoven first fabric including ultrafine fibers having a fineness of not more than 0.01 decitex; and
a first elastomeric polymer impregnated in the first fabric;

(B) an adhesive layer; and (C) a substrate layer, including:
an entangled nonwoven second fabric including fibers having a fineness of not less than 0.05 decitex; and
a second elastomeric polymer impregnated in the second fabric;

wherein at least a portion of the napped outer surface is covered with a third polymer, the third polymer being solid at a temperature of 20–25° C. and having a melting point not lower than 60° C. and having an elongation at break of not more than 10%. Another embodiment of the present invention provides a shoe upper, that includes the above-mentioned laminated sheet material. Another embodiment of the present invention provides an artificial leather shoe and a method for making an artificial leather shoe.

44 Claims, No Drawings

ARTIFICIAL LEATHER SHOE AND ARTIFICIAL LEATHER SUITED THEREFOR

BACKGROUND OF THE INVENTION

1. Field of the Invention

This invention relates to an artificial leather material exhibiting excellent performance characteristics such as softness, quality appearance, and peel strength. The present invention also relates to a method of producing the artificial leather and to a use of the artificial leather material in a shoe upper.

2. Discussion of the Background

Rapid developments have been made recently in the field of shoe upper materials, including foot protection, fitness and fashionability. Some upper materials that exhibit excellent fitness and fashionability, however, cannot be used as shoe uppers because of their insufficient peel strength and questionable suitability for shoemaking. Further, some kinds of shoe are required to have even higher peel strength. A method is known for sewing shoes using a material having low peel strength, but such a method is poor in productivity and is applicable only to limited types of shoes.

To increase the peel strength of shoes, JP Kokai H09-103303 proposes a method which includes adhering the shoe upper material to a shoe sole with through-holes and reinforcing the material with an adhesive. To attain a sufficient level of peel strength, however, a large number of through-holes must be provided and, as a result, the strength of the shoe upper is markedly decreased.

JP Kokai H10-192004 proposes a method which includes inserting an adhesive sheet between the sole and shoe upper faces and heating the sandwich structure under pressure. Such a method, however, impairs the softness of the shoe upper material.

Thus, with the conventional methods discussed above, it is difficult to produce shoes having a sufficient level of peel strength without impairing the softness, fashionability, quality appearance and the like of shoe upper materials.

SUMMARY Of THE INVENTION

It is an object of the present invention to provide a shoe having a sufficient level of peel strength without impairing the softness, fashionability, quality appearance and the like of shoe upper materials.

These and other objects of the present invention may be accomplished with the present invention, the first embodiment of which includes a laminated sheet material, including, in order:
(A) a substrate layer having an inner surface and at least a partially napped outer surface and including:
  an entangled nonwoven first fabric including ultrafine fibers having a fineness of not more than 0.01 decitex; and
  a first elastomeric polymer impregnated in the first fabric;
(B) an adhesive layer; and
(C) a substrate layer, including:
  an entangled nonwoven second fabric including fibers having a fineness of not less than 0.05 decitex; and
  a second elastomeric polymer impregnated in the second fabric;
a wherein at least a portion of the napped outer surface is covered with a third polymer, the third polymer being solid at a temperature of 20–25° C. and having a melting point not lower than 60° C. and having an elongation at break of not more than 10%.

Another embodiment of the present invention provides a shoe upper, that includes the above-mentioned laminated sheet material.

Another embodiment of the present invention provides an artificial leather shoe, that includes the above-mentioned laminated sheet material.

Another embodiment of the present invention provides an artificial leather shoe, that includes:
a shoe upper and a shoe sole; wherein
  the shoe upper includes, in order:
    (A) a substrate layer having an inner surface and at least an outer surface and including:
      an entangled nonwoven first fabric including ultrafine fibers having a fineness of not more than 0.01 decitex; and
      a first elastomeric polymer impregnated in the first fabric;
    (B) an adhesive layer; and
    (C) a substrate layer, including:
      an entangled nonwoven second fabric including fibers having a fineness of not less than 0.05 decitex; and
      a second elastomeric polymer impregnated in including second fabric;
    wherein the outer surface of said substrate layer (A) forms an exterior surface of the shoe upper;
    wherein the shoe sole is fixedly bonded to a portion of the shoe upper with an adhesive;
    wherein, at the portion of the shoe upper that is fixedly bonded to the shoe sole, the substrate layer (A) and the adhesive layer (B) have been substantially removed such that the substrate layer (C) is directly bonded to the shoe sole with the adhesive.

Another embodiment of the present invention provides a method of making an artificial leather shoe, which includes:
bonding a portion of a shoe upper to a shoe sole together with an adhesive;
wherein the shoe upper includes, in order:
  (A) a substrate layer having an inner surface and at least an outer surface and including:
    an entangled nonwoven first fabric including ultrafine fibers having a fineness of not more than 0.01 decitex; and
    a first elastomeric polymer impregnated in the first fabric;
  (B) an adhesive layer; and
  (C) a substrate layer, including:
    an entangled nonwoven second fabric including fibers having a fineness of not less than 0.05 decitex; and
    a second elastomeric polymer impregnated in the second fabric;
  wherein the outer surface of the substrate layer (A) forms an exterior surface of the shoe upper;
  wherein, prior to bonding the portion of the shoe upper to the shoe sole together, the substrate layer (A) and the adhesive layer (B) are substantially shaved off in the portion of the shoe upper such that the substrate layer (C) is directly bonded to said shoe sole.

DESCRIPTION OF THE PREFERRED EMBODIMENTS

Various other objects, features and attendant advantages of the present invention will be more fully appreciated as the same becomes better understood from the following detailed description of the preferred embodiments of the invention.

The invention preferably includes a shoe including a shoe upper made of a shoe upper material, which is a laminate composed of a substrate layer (A) including an entangled nonwoven fabric made of ultrafine fibers having a fineness of not more than 0.01 decitex and containing an elastomeric polymer, an adhesive layer (B) and a substrate layer (C) including an entangled nonwoven fabric made of fibers having a fineness of not less than 0.05 decitex and containing an elastomeric polymer, as layered in that order, with the surface of the layer (A) serving as the exterior, and a shoe sole material fixedly bonded to the shoe upper by means of an adhesive, which shoe is characterized in that the layer (A) and layer (B) of the shoe upper material have been substantially removed in that part which bonds the shoe upper material and sole material together, so that the layer (C) is directly bonded to the sole material by means of an adhesive.

The invention also includes a method of making artificial leather shoes which includes preparing a shoe upper from a laminate composed of a substrate layer (A) including an entangled nonwoven fabric made of ultrafine fibers having a fineness of not more than 0.01 decitex and containing an elastomeric polymer, an adhesive layer (B) and a substrate layer (C) including an entangled nonwoven fabric made of fibers having a fineness of not less than 0.05 decitex and containing an elastomeric polymer, as layered in that order, with the surface of the layer (A) serving as the exterior, and making a shoe using the shoe upper, which method is characterized in that, prior to bonding the shoe upper and sole material together, the layer (A) and layer (B) are substantially shaved of fin that part which bonds the shoe upper and sole material together and then the layer (C) is directly bonded to the sole material by means of an adhesive.

The invention further includes a leather-like sheet material which is a laminate composed of the above-mentioned substrate layer (A), adhesive layer (B) and substrate layer (C) and is characterized in that at least part of the outer surface of substrate layer (A) is napped and the ultrafine fibers thereof are covered with a polymer which is a solid at ordinary temperature and has a melting point of not lower than 60° C. and an elongation at break of not more than 10%, so that there are portions appearing whitish due to interfacial separation of the polymer from ultrafine fibers or due to cracking of the polymer as mingled with portions appearing deep colored due to a lesser extent of interfacial separation of the polymer from ultrafine fibers or due to a lesser extent of cracking of the polymer.

Further, the invention includes a leather-like sheet material which is a laminate composed of a substrate layer (A) including an entangled nonwoven fabric made of ultrafine fibers having a fineness of not more than 0.01 decitex and containing an elastomeric polymer, an adhesive layer (B) and a substrate layer (C) including an entangled nonwoven fabric made of fibers having a fineness of not less than 0.05 decitex and containing an elastomeric polymer, as layered in that order, and is characterized in that at least part of the outer surface of substrate layer (A) is covered with napping fibers, which are part of the above-mentioned ultrafine fibers and covered with a polymer which is a solid at ordinary temperature and has a melting point of not lower than 60° C. and an elongation at break of not more than 10%, and in that it has a pattern of light and dark as resulting from differences in the amount of the polymer occurring here and there.

The sheet material for use as the shoe upper which is composed of the substrate layer (A), adhesive layer (B) and substrate layer (C) has already been a subject of patent applications (U.S. Ser. No. 09/506,683, filed Feb. 18, 2000; Laid-open European Patent Application No. 1031656; Korean Patent Application No. 6956/2000; Laid-open Chinese Patent Application No. 1264770; Formosan Patent Application No. 89102937), the entire contents of each of which being hereby incorporated by reference, the same as if set forth at length.

First, the sheet material for shoe upper which is to be used in the practice of the invention is composed of a substrate layer (A), an adhesive layer (B) and a substrate layer (C). Such sheet material is not sufficient in peel strength of the bond or adhesion but has softness and quality appearance. In the practice of the invention, the sheet material for shoe upper may include a further layer inserted between the substrate layer (A) and adhesive layer (B) or between the adhesive layer (B) and substrate layer (C).

In producing such sheet material for shoe uppers, the substrate layer (A) and substrate layer (C) are prepared separately and then bonded together, whereupon the adhesive layer (B) is formed.

The layer (A) includes a nonwoven fabric made of entangled ultrafine fibers having a fineness of not more than 0.01 decitex and an elastomeric polymer contained therein. The fineness of the ultrafine fibers is not more than 0.01 decitex, preferably not more than 0.005 decitex, more preferably within the range of 0.001 to 0.0001 decitex. When it is in excess of 0.01 decitex, surface napping may fail to give a nubuck (buffed-grain leather)-like or suede-like high-quality and fine-texture luster and/or touch, or graining may fail to achieve thin-film finish treatment due to an unevenness surface feel resulting from the thickness of fibers but give a material far from a natural leather. When it is less than 0.0001 decitex, coloring by dyeing of napped products cannot give the desired depth of color.

The ultrafine fibers can be produced by any of the methods known in the art which include producing ultrafine fibers from ultrafine fiber-generating fibers obtained by the mixed spinning method, conjugated spinning method or the like spinning method using two or more polymers differing in solubility or decomposability, for example by the method including eliminating part thereof (e.g. the sea-component polymer) by extraction or decomposition to give ultrafine fibers, which method is to be applied to ultrafine fiber-generating fibers whose section has a sea-island structure, or in the case where the ultrafine fiber-generating fibers are separable fibers obtained by conjugated spinning, by the method including treating them for interfacial separation of the constituent polymers from each other by peeling, or by the so-called melt-blow method which includes rendering fibers just discharged from the melt spinning nozzle ultrafine by blowing them with a high-velocity gas. Preferred from the viewpoint of fiber thickness control and/or ultrafine fiber stability, however, is the method which involves treatment of the above-mentioned ultrafine fiber-generating fibers, in particular the method including removing part (e.g. the sea component polymer) of ultrafine fiber-generating fibers whose section has a sea-island structure by extraction or decomposition to give ultrafine fibers.

The ultrafine fiber-constituting resin, which is not particularly restricted, may be a fiber-forming polymer selected from among aromatic polyesters such as polyethylene terephthalate and polybutylene terephthalate, polyamides such as nylon-6, nylon-66 and nylon-6 10, polyolefins such as polyethylene and polypropylene and other known resins. Those ultrafine fiber bundles obtained from fibers having a sea-island structure in which the island component is a polyamide-by removing the sea component by extraction or decomposition are preferred among others since they can give leather-like sheet materials highest in softness and quality appearance.

As specific examples of that resin component (sea-component polymer) which is a constituent of ultrafine fiber-generating fibers and is to be removed by extraction or decomposition, there may be mentioned at least one polymer selected from among such polymers as polyethylene, polypropylene, ethylene-propylene copolymers, ethylene-vinyl acetate copolymers, polystyrene, styrene-acrylic monomer copolymers and styrene-ethylene copolymers. It is desirable that the resin (sea-component polymer) constituting ultrafine fiber-generating fibers and to be removed by extraction or decomposition be incompatible with the island-component polymer in the molten state.

Now, the method of forming an artificial leather substrate using the above-mentioned ultrafine fibers or ultrafine fiber generating fibers is explained. The substrate formation can be accomplished by a conventional method, for example by carrying out the steps of producing an entangled nonwoven fabric made of ultrafine fiber-generating fibers, impregnating the entangled nonwoven fabric with an elastomeric polymer and coagulating the polymer, and converting the ultrafine fiber-generating fibers to ultrafine fibers, in that order. It is of course possible to reverse the order of the step of conversion to ultrafine fibers and the step of impregnation with and coagulation of the elastomeric polymer.

For producing an entangled nonwoven fabric using ultrafine fiber-generating fibers, the ultrafine fiber-generating fibers are subjected to such treatments as spinning, stretching, thermal fixation, crimping and cutting in the conventional manner, to give a raw stock of those fibers. Such raw stock is opened on a card and formed into a random web or cross-lap web on a webber. When necessary, webs thus obtained are layered to attain a desired basis weight. The basis weight of the web is adequately selected according to the intended final use and, generally, it is preferably within the range of 100 to 3,000 g/m$^2$. For cost reduction, for instance, it is also possible to efficiently produce two substrates at a time by impregnating an entangled nonwoven fabric having a weight about twice the required weight with an elastomeric polymer and then divide it into two in the direction of thickness using a band knife or the like.

Following the step of web layering, the web is converted to an entangled nonwoven fabric by entangling treatment such as needle punching or high-pressure water jet entanglement. The needle punching density and needle punching conditions may vary according to the shape of the needle and the thickness of the web but, generally, the density is preferably selected within the range of 200 to 2,500 punches /cm$^2$. More preferably, the density is within the range of 400 to 2,000 punches /cm$^2$, more particularly preferably within a range of 800 to 1,500 punches /cm$^2$, and most preferably within a range of 1000 to 1200 punches/cm$^2$.

Prior to impregnation of the entangled nonwoven fabric with an elastomeric polymer, the fabric may be subjected to surface smoothing treatment by a method known in the art, for example by heating under pressure, if necessary. In cases where the fibers constituting the entangled nonwoven fabric are ultrafine fiber generating fibers whose sea component is a low-melting polymer, typically polyethylene, for instance, and whose ultrafine island component is a high-melting polymer, typically a polyester or polyamide, the heating under pressure is particularly preferred, since it can give an entangled nonwoven fabric excellent in surface smoothness as a result of fusion of the sea-component low-melting polymer, for example polyethylene. When the fibers constituting the entangled nonwoven fabric are other than ultrafine fiber-generating fibers capable of being converted to ultrafine fibers by removing one component thereof by dissolution, it is preferable to cover the fiber surface with a temporary filler material, such as polyvinyl alcohol, prior to impregnation treatment with an elastomeric polymer solution so that the leather-like sheet material obtained by retention of the elastomeric polymer used for impregnation on fibers can be prevented from becoming hard in hand touch. For ultrafine fiber-generating fibers capable of being converted to ultrafine fibers upon removal of one component by dissolution, too, the provision of a temporary filler material at the stage of entangled nonwoven fabrics can render the sheet material more flexible.

The elastomeric polymer to be used for impregnating the entangled nonwoven fabric therewith may be any of those known in the art. From the hand touch viewpoint, the use of a polyurethane resin is preferred. As preferred examples of the polyurethane resin, there may be mentioned the so-called segmented polyurethanes obtained by using, as a soft segment, at least one polymer diol having a number average molecular weight of 500 to 5,000 selected from the group including polyester diols obtained by reacting a diol with a dicarboxylic acid or an ester-forming derivative thereof, polylactone diols, polycarbonate diols, polyether diols, polyether ester diols and the like and reacting such soft segment component with a diisocyanate compound and a low-molecular chain extender. More preferably, the number average molecular weight of the diol is between 700 and 4,000; more particularly preferably between 1,000 and 3,500, and most preferably between 1,200 and 2,000.

Preferred as the above-mentioned soft segment-constituting polyester diols are those synthesized from an aliphatic diol compound containing 2 to 10 carbon atoms and a dicarboxylic acid. As preferred examples of the C2–C10 aliphatic diol compound, there may be mentioned ethylene glycol, butanediol, 3-methyl-1,5-pentanediol, 1,6-hexanediol, 2-methyl-1,8-octanediol, 1,9-nonanediol, 1,10-decanediol and the like. As typical examples of the dicarboxylic acid, there may be mentioned such aliphatic dicarboxylic acids as succinic acid, glutaric acid, adipic acid, azelaic acid and sebacic acid, and such aromatic dicarboxylic acids as terephthalic acid and isophthalic acid. Mixtures are possible.

When the number average molecular weight of the polymer diol is less than 500, the flexibility is lacking and no natural leather-like hand touch can be obtained. When the number average molecular weight of the polymer diol is above 5,000, the urethane group concentration in the resulting polyurethane decreases and, therefore, it is difficult to obtain a substrate sheet balanced among flexibility, durability, heat resistance and hydrolysis resistance. As typical examples of the diisocyanate compound, there may be mentioned diphenylmethane-4,4'-diisocyanate, tolylene diisocyanate, dicyclohexylmethane-4,4'-diisocyanate, isophoronediisocyanate, hexamethylene diisocyanate and the like. As examples of the chain extender, there may be mentioned, among others, low-molecular compounds having two active hydrogen atoms, such as ethylene glycol, propylene glycol, butanediol, hexanediol, ethylenediamine, 4,4'-diaminodicyclohexylmethane and isophoronediamine.

If necessary, a pigment, a dye, a coagulation adjusting agent, any of various stabilizers and/or the like may be added to the elastomeric polymer and it is also possible to use two or more polymers in combination as the elastomeric polymers. The elastomeric polymer may be used in the form of a solution or suspension.

The method of impregnating the entangled nonwoven fabric with the elastomeric polymer is not particularly restricted. From the hand touch balance viewpoint, however, the method including immersing the entangled nonwoven fabric in an elastomeric polymer solution to thereby impregnating the entangled nonwoven fabric directly with the elastomeric polymer solution, if necessary followed by squeezing using a mangle, or the method including effecting impregnation by coating with an elastomeric polymer solution using a coater is preferred. The elastomeric polymer used for impregnation is then coagulated. The most preferred method of coagulation is the wet coagulation method since it readily gives a natural leather-like hand touch and flexibility.

From the viewpoint of natural leather-like soft touch, the weight ratio between the sheet -constituting fibers and the elastomeric polymer is preferably within the range of 90/10 to 20/80, more preferably within the range of 80/20 to 30/70, and most preferably within the range of 70/30 to 40/60. When the proportion of fibers is excessively low, the leather-like sheet material will unfavorably have a rubber-like hand touch. An excessively high fiber proportion will lead to a paper-like hand touch, hence the desired natural leather-like hand touch will not be obtained.

After impregnation of the entangled nonwoven fabric with the elastomeric polymer, the impregnated nonwoven fabric is treated with a liquid serving as a nonsolvent for the elastomeric polymer and the island component of the ultrafine fiber-generating fibers but as a solvent or decomposing agent for the sea component, to convert the ultrafine fiber-generating fibers to ultrafine fibers and thereby give a sheet including the ultrafine fiber-entangled nonwoven fabric and the elastomeric polymer. It is of course possible to produce, prior to impregnation with the elastomeric polymer, a sheet by using such method of converting ultrafine fiber-generating fibers to ultrafine fibers.

For elaborating the design of the thus-obtainable sheet including the ultrafine fiber-entangled nonwoven fabric and the elastomeric polymer, any of various known surface treatments may be carried out, without any particular limitation. Thus, for example, there are available the method including napping treatment to attain a suede-like or nubuck-like appearance, the method including combining embossing and buffing to attain a partially buffed grain-like surface, the method including coating with a resin layer to attain a grained appearance, and the method including providing a foamed polyurethane layer, followed by surface buffing to attain a polyurethane-based suede-like appearance.

The substrate layer (A) preferably has a thickness of 0.2 to 2.0 mm, more preferably 0.5 to 1.5 mm, and most preferably between 0.75 to 1.0 mm. Preferably, the substrate layer (A) has a basis weight of 60 to 600 g/m$^2$, more preferably 80 to 500 g/m$^2$, more particularly preferably 100 to 300 g/m$^2$, and most preferably 150 to 200 g/m$^2$. These thicknesses and weights are preferred from the viewpoint of processability in sheet production and cuttability/shavability in shoemaking.

The substrate layer (C) is now described. The substrate layer (C) is a layer made by impregnating an entangled nonwoven fabric made of fibers having a fineness of not less than 0.05 decitex with an elastomeric polymer. In particular, the substrate layer (C) is that layer which is substantially bonded to the sole in making the shoe, which is a subject matter of the present invention, and develops sufficient peel strength as intended by the present invention.

For that purpose, the fibers constituting the layer (C) have a fineness of not less than 0.05 decitex, preferably 0.05 to 4.0 decitex, more preferably 0.1 to 3.5 decitex, more particularly preferably 1 to 3 decitex, and most preferably 1.5 to 2.5 decitex. The use of an ultrafine fiber-entangled nonwoven fabric in which the layer (C) constituting fibers have a fineness of less than 0.05 decitex may lead to improvements in workability in shoemaking and in hand touch, peel strength and other features of shoes but will not give satisfactory peel strength between the shoe upper and sole after shoemaking. When the fineness is above 4.0 decitex, high peel strength may be obtained between the shoe upper and sole after shoemaking but the wrinkles of bending part, workability in shoemaking, hand touch are impaired and, further, the peel strength decreases.

Except for the thickness of fibers constituting the substrate layer (C), substantially the same polymeric elastomer as mentioned above referring to the substrate layer (A) and the same production methods as mentioned above can be used or employed in preparing the layer (C). The substrate layer (C) has a thickness of 0.5 to 3.0 mm, more preferably 0.75 to 2.5 mm, more particularly preferably 1 to 2.2 mm and most preferably 1.2 to 2.0 mm. The substrate layer (C) preferably has a weight of 100 to 1,000 g/m$^2$, more preferably 120 to 900 g/m$^2$, more particularly preferably 180 to 700 g/m$^2$, and most preferably 300 to 500 g/m$^2$. These thicknesses and weights are preferred from the viewpoint of peel strength and workability in shoemaking.

Preferably, the thickness ratio between the substrate (A) and substrate layer (C) is preferably within the range of 1:1 to 1:10, more preferably 1:2 to 1:9, more particularly preferably 1:3 to 1:8, and most preferably 1:5 to 1:7, from the viewpoint of workability in shoemaking, settability and peel strength.

The adhesive layer (B) of the invention, includes a resin for bonding the above layer (A) and layer (C) together. The resin to be used in the adhesive layer (B) may be any of the known resins, without any particular restriction. Thus, mention may be made of polyurethane resins, polyamide resins, polyester resins, polyacrylic resins, natural rubbers and synthetic rubbers, among others. Among them, polyurethane resins are most preferred from the hand touch viewpoint. The mode of adhesive application includes whole area (overall) application and partial application. From the viewpoint of hand touch, air permeability, moisture permeability and so on, partial application, in particular spot application, is preferred. The method of adhesion may be any of the known methods, without any particular restriction. For example, gravure coating with a solution prepared by dissolving the adhesive resin in a solvent or a suspension prepared by suspending the resin in a dispersion medium, hot melt adhesion, or flame lamination may be employed. From the viewpoint of moisture permeability, peel strength and workability in the step of cutting and shaving in shoemaking, the coating weight is preferably 2 to 20 g/m$^2$ on the adhesive solids basis. More preferably the coating weight is 3 to 15 g/m$^2$, more particularly preferably 5 to 10 g/m$^2$, and most preferably 7 to 9 g/m$^2$.

In the practice of the invention, it is preferred that the color difference $\Delta E_A$ between the substrate (A) and adhesive layer (B) and the color difference $\Delta E_C$ between the substrate (C) and adhesive layer (B) be both or independently not less than 2.0 so that the portion to be shaved in shoemaking can be identified with ease. For attaining a color difference not less than 2.0, the adhesive layer (B) may be given a whitish hue by adding a white pigment, for example titanium oxide or a pearl pigment, thereto when the substrate (A) and substrate (C) have a moderately deep color and, when the substrate (A) and substrate (C) have a white or light color, a blackening pigment, for example carbon black, may be added to the resin of the adhesive layer (B) to give a black hue to the layer (B) to thereby attain a desired color difference. More preferably, the $\Delta$ $E_A$ and $\Delta$ $E_C$ are, independently, not less than 3.0 and most preferably not less than 5.0.

The laminate composed of such substrate layer (A), adhesive layer (B) and substrate layer (C) is used as the shoe upper material. The -shoe upper is prepared using the substrate (A) so as to appear on the exterior surface of the shoe. In making a shoe using this shoe upper, that portion of the layer (A) and layer (B) of the shoe upper which corresponds to the portion of the layer (C) to be bonded to the sole are substantially shaved off prior to bonding of the shoe upper to the sole and then the layer (C) is directly bonded to the sole by means of an adhesive. As the means for shaving the layer (A) and layer (B), there may be mentioned a sand paper, wire brush, grindstone, etc. In the practice of the invention, it is not necessary to absolutely remove the layer (A) and layer (B) by shaving but the layers may partly remain. Thus, only such a condition is required that at least part of the adhesive applied for bonding to the sole can penetrate the layer (C) to develop layer (C)-dependent peel strength.

In the practice of the invention, it is preferred that the peel strength of the bond of the substrate layer (C) be not less than 7.0 kg/2.5 cm and the ratio of the bond peel strength of the substrate layer (C) to the bond peel strength of the substrate layer (A) be not less than 1.5. When the bond peel strength of layer (C) is less than 7.0 kg/2.5 cm, the level of peel strength required of sports shoes cannot be obtained, hence the material is not suited for making sports shoes. When the ratio of the bond peel strength of layer (C) to the bond peel strength of layer (A) is less than 1.5, the peel strength improving effect intended by the invention becomes slight. More preferably, the peel strength of the substrate layer (C) is not less than 7.5 kg/2.5 cm and most preferably not less than 8 kg/2.5 cm. More preferably, the ratio of the bond peel strength of the substrate layer (C) to the bond peel strength of the substrate layer (A) is not less than 1.7, and most preferably not less than 1.9.

Generally used as the sole material are vulcanized rubber, EVA sponge, polyurethane, polyvinyl chloride, nylon and the like. The adhesive to be used in bonding the sole and shoe upper together may be a polyurethane-, polychloroprene- or natural rubber-based one, for instance. Among them, the polyurethane- or polychloroprene-based one is preferred from the viewpoint of workability, adhesiveness, durability and yellowing resistance. The method of applying the adhesive includes manual application and the use of an automatic coater, among others. The coating weight is preferably 5 to 20 g/m², more preferably 8 to 18 g/m², and most preferably 12 to 16 g/m² on the adhesive solids basis.

The shoes according to the invention include a material having softness and quality appearance and have sufficient peel strength while retaining the sensation features and therefore are suited as sports shoes, athletic shoes, mountain climbing boots, safety shoes, shoes for general use, and so forth.

Referring to the artificial leather suited for use in making the shoes according to the invention, it is particularly preferred that the surface of the substrate (A) which is opposite to the surface on which the adhesive layer (B) is laid, namely the outside surface of the shoe upper, be napped and the ultrafine fibers constituting the nap be coated with a third polymer which is a solid at ordinary temperature and has a melting point not lower than 60° C. and an elongation at break of not more than 10%, so as to show portions appearing whitish due to interfacial separation of the polymer from ultrafine fibers or due to cracking of the polymer as mingled with portions appearing deep colored due to a lesser extent of interfacial separation of the polymer from ultrafine fibers or due to a lesser extent of cracking of the polymer. In such case, a grained appearance intrinsic in natural leathers and a pattern of light and dark resulting from scratching and characteristic of natural leathers are produced and the leather-like sheet material having unique leather-like uneven surface and soft and flexible touch and useful in shoemaking or the like is obtained. When a polymer having a melting point lower than 60° C. is used, the portions appearing whitish due to separation of the polymer and ultrafine fibers or cracking of the polymer hardly appear, hence such a polymer is unsuited. The finished leather-like sheet material is in many cases warmed in a post-treatment step or during wearing of shoes. On such occasions, the covering polymer having a melting point lower than 60° C. will readily go into the base structure. This is undesirable. A polymer having a melting point of 70 to 130° C. is preferred. This polymer preferably has an elongation at break of not more than 10%. When a polymer having an elongation at break of higher than 10% is used, the covering polymer film will not be readily separated or cracked upon crumpling treatment carried out after application, hence the mingling of portions appearing whitish with portions appearing deeper in color will not be attained. A more preferred range of elongation at break is not more than 5%.

As specific examples of the third polymer which is a solid at ordinary temperature and has a melting point of not lower than 60° C. and an elongation at break of not more than 10%, there may be mentioned petroleum wax, synthetic wax, polyethylene wax, paraffin wax, natural wax and microcrystalline wax. Since these waxes include species having a melting point of 60° C. or above and species having a melting point lower than 60° C. and species having an elongation at break of not more than 10% and species having an elongation at break of more than 10%, it is desirable to use those species satisfying the above requirements concerning the melting point and elongation at break. A plurality of those waxes falling within the scope of the invention may of course be selected. The waxes may be partly modified with amide groups, fluorine atoms and/or the like. Unless the effects of the invention are impaired, paraffin-based or naphthene-based process oils, white oils, mineral oils, liquid paraffins, silicone oils, metal soaps, other surfactants, and colorants, for instance, may be added. An appropriate level of addition thereof is preferably not more than 20% by weight. At a higher addition level, the influences of the additives become significant and may unfavorably impair the effects of the invention.

In the practice of the invention, it is possible to reproduce various touches, from a smooth and oiled appearance to a dry touch and waxy type, by varying the melting point of the wax employed and/or the coating weight. In any case, the polymer amount to be applied is preferably within the range of 1 to 100 g/m², in particular 5 to g/m², on the solid basis.

In the practice of the invention, the polymer is applied to the napped surface of the substrate (A), so that it may occur on the surface opposite to the surface on which the adhesive layer (B) is to be laid. When the surface of substrate (A) is the so-called grain-finished surface and the polymer is applied to this surface, the polymer will not substantially penetrate the inside but remain on the surface and therefore will unfavorably be peeled off by a slight external force.

The surface of the substrate (A) can be napped by any method known in the art, for example by buffing or combing. Since the length of the nap raised exerts an influence on the appearance after polymer coating or impregnation, the length is adjusted by selecting appropriate buffing or combing conditions, for example the sandpaper number, shaving speed and pressing pressure.

For polymer coating, any of the conventional methods of application can be used. For example, use may be made of the technique of knife coating or gravure transfer printing with the polymer liquefied by heating to a temperature above the melting point or a solution prepared by dissolving the polymer in a solvent, or spraying an aqueous emulsion prepared by dispersing the polymer in water using a surfactant or the like, or applying the same to the substrate layer (A) using a gravure roll, comma coater or the like. The polymer applied according to the invention is integrated with the nap raised and occurs as a layer on the surface of substrate layer (A). When, for example, the polymer applied does not occur as a layer on the surface but occurs merely in a state such that it separately covers the surface of individual raised fibers or when the polymer mostly penetrates into the inside of the substrate layer (A) and scarcely remains on the napped surface, it is impossible to attain the grained and scratched pattern intrinsic in natural leathers or the natural leather-like unique leather-like uneven surface and flexible touch, which are aimed at by the present invention.

In the practice of the invention, the shaded creepy pattern is caused to develop by crumpling treatment after polymer application. Suitable as the crumpling treatment is the so-called dry crumpling technique which includes holding the leather-like sheet material at both width ends and subjecting the same to crumpling. The leather-like sheet material obtained in that manner has a grained and scratched pattern peculiar to natural leathers and natural leather-like unique leather-like uneven surface and flexible touch.

Further, in more preferred cases in the practice of the invention, a shaded pattern arises owing to the differences in polymer amount according to the places of occurrence of the polymer. In such cases, the product obtained closely resembles natural leathers and has a unique three-dimensional effect owing to the effects of light and dark in surface color. As an appropriate method for the production thereof, there may be mentioned the method which includes the step of shoemaking in which shoes are made using the above-mentioned artificial leather including the substrate layer (A), adhesive layer (B) and substrate layer (C) and provided with the polymer on the surface of substrate layer (A) as the shoe upper material and the step of unevenly applying heat to the shoes to make differences in polymer amount according to the places of occurrence of the polymer and thereby cause a pattern of light and dark to appear on the surface. The method of unevenly applying heat is not particularly restricted but there may be mentioned, for example, the method including passing the shoes through a zone having a heat source in one direction, the method including heating those parts alone which are to be rendered lighter in color by means of a spot drier or the like, and the method including pressing a heated metal partially against the shoes. That heating may also be effected on the occasion of heat treatment for driving the adhesion between the shoe upper and sole to completion in shoemaking or on the occasion of heat treatment for rendering the shoe surface irregular or uneven.

The "differences in polymer amount according to the places of occurrence of the polymer" means the differences between (1) those portions where the polymer applied occurs in the form of a layer covering the surface of the substrate (A) and occurs only in a small proportion in the inside fiber structure and (2) those portions where the polymer has penetrated into the interior of the substrate layer (A) by the heat applied thereto and occurs in a decreased proportion on the napped surface. Thus, the portions (1) appear deepened in color due to suppression, by the covering polymer, of diffuse reflection from fibers while the portions (2), where the surface polymer amount is small and raised ultrafine fibers are exposed and, accordingly, the fiber gathering effect is insignificant, appear lighter in color due to diffuse reflection. Occurrence of the portions (1) and portions (2) in a mingled manner results in manifestation of a pattern of light and dark. Causing the color of the shoe to appear light or shaded according to the sites in that manner is effective in obtaining shoes with an increased three-dimensional effect. As remarkable examples, there may be mentioned the use of different color hues as follows: the toe cap of the shoe is caused to appear deeper in color and the shank portion to appear lighter in color; or the upper part of the heel is caused to appear lighter in color and the lower part to appear deeper in color. It is also possible to make differences in polymer amount by pressing a heated metal carrying a logo or symbol mark or a geometrical pattern against the shoe.

If the practice of the invention, the portions (1) deeper in color may occur as independent portions in the portions (2) lighter in color, or the portions (2) lighter in color may occur as independent portions in the portions (1) deeper in color, or the portions (1) deeper in color and the portions (2) lighter in color may both as independent portions, for instance. All such cases are acceptable. Each independent portion deeper or lighter in color may have a size such that it can be distinguished by the eye. Specifically, a size of not less than 0.5 cm$^2$ is desirable for obtaining a pattern of light and dark which has a natural leather-like three-dimensional effect. More preferably, the size is not less than 0.7 cm$^2$ and most preferably not less than 0.9 cm$^2$.

The temperature to which heating is made to cause the portions (1) deeper in color and the portions (2) lighter in color to appear is desirably higher by at least 5° C. than the melting point of the polymer applied. However, since there is a melting point distribution, even a temperature lower than the melting point may be sufficient to cause variations in color intensity in some instances. Therefore, the temperature should be selected according to the shape of shoes, the method of heating, the polymer employed and other factors. The time for heating may be selected within the range of 5 seconds to 30 minutes according to the structure of the equipment for heating treatment, the shape of moldings and the polymer employed.

The shoes whose shoe upper is made of the leather-like sheet material prepared by causing differences in polymer occurrence amount as mentioned above have a three-dimensional effect very close to that of natural leathers.

Other especially preferred embodiments of the invention are given below in A–G:

A. A laminated sheet material, including, in order:
  (A) a substrate layer having an inner surface and an outer surface and including:
    an entangled nonwoven first fabric including ultrafine fibers having a fineness of not more than 0.01 decitex; and
    a first elastomeric polymer impregnated in said first fabric;

(B) an adhesive layer in contact with said inner surface; and
(C) a substrate layer, including:
an entangled nonwoven second fabric including fibers having a fineness of not less than 0.05 decitex; and
a second elastomeric polymer impregnated in said second fabric;
wherein said outer surface of substrate layer (A) is a napped surface wherein at least a portion of said ultrafine fibers are covered with a third polymer, said third polymer being solid at a temperature of 20–25° C. and having a melting point not lower than 60° C. and having an elongation at break of not more than 10%, wherein said napped surface includes portions appearing whitish due to interfacial separation of the polymer from napping ultrafine fibers or due to cracking of the polymer as mingled with portions appearing deep colored due to a lesser extent of interfacial separation of the polymer from napping ultrafine fibers or due to a lesser extent of cracking of the polymer.

B. A laminated sheet material, including, in order:
(A) a substrate layer having an inner surface and a napped outer surface and including:
an entangled nonwoven first fabric including ultrafine fibers having a fineness of not more than 0.01 decitex; and
a first elastomeric polymer impregnated in said first fabric;
(B) an adhesive layer in contact with said inner surface; and
(C) a substrate layer, including:
an entangled nonwoven second fabric including fibers having a fineness of not less than 0.05 decitex; and
a second elastomeric polymer impregnated in said second fabric;
wherein at least a portion of said napped outer surface includes said ultrafine fibers covered with a third polymer, said third polymer being solid at a temperature of 20–25° C. and having a melting point not lower than 60° C. and having an elongation at break of not more than 10%, wherein the napped outer surface further includes a plurality of light and dark resulting from differences in an amount of the third polymer occurring here and there.

C. An artificial leather shoe including a shoe upper made of a shoe upper material, which is a laminate composed of a substrate layer (A) including an entangled nonwoven fabric made of ultrafine fibers having a fineness of not more than 0.01 decitex and containing an elastomeric polymer, an adhesive layer (B) and a substrate layer (C) including an entangled nonwoven fabric made of fibers having a fineness of not less than 0.05 decitex and containing an elastomeric polymer, as layered in that order, with the surface of the layer (A) serving as the exterior, and a shoe sole material fixedly bonded to the shoe upper by means of an adhesive, which shoe is characterized in that the layer (A) and layer (B) of the shoe upper material have been substantially removed in that portion which bonds the shoe upper material and sole material together, so that the layer (C) is directly bonded to the sole material by means of an adhesive.

D. An artificial leather shoe as mentioned in embodiment C, above, wherein the entangled nonwoven fabric constituting the layer (A) is composed of ultrafine polyamide fiber bundles, with the exterior surface being at least partly napped or with a resin layer including a macromolecular elastomer being laid on the exterior surface.

E. An artificial leather shoe as mentioned in embodiment C, above, wherein the bond peel strength of the substrate (C) is not less than 7.0 kg/ 2.5 cm and the ratio of the bond peel strength of the layer (C) to the bond peel strength of the substrate layer (A) is not less than 1.5.

F. An artificial leather shoe as mentioned in embodiment C, above, wherein the color difference $\Delta E_A$ between the substrate (A) and adhesive layer (B) and the color difference $\Delta E_C$ between the substrate (C) and adhesive layer (B) are both not less than 2.0.

G. A method of making artificial leather shoes which includes preparing a shoe upper from a laminate composed of a substrate layer (A) including an entangled nonwoven fabric made of ultrafine fibers having a fineness of not more than 0.01 decitex and containing an elastomeric polymer, an adhesive layer (B) and a substrate layer (C) including an entangled nonwoven fabric made of fibers having a fineness of not less than 0.05 decitex and containing an elastomeric polymer, as layered in that order, with the surface of the layer (A) serving as the exterior, and making a shoe using the shoe upper, which method is characterized in that, prior to bonding the shoe upper and sole material together, the layer (A) and layer (B) are substantially shaved off in that part which bonds the shoe upper and sole material together and then the layer (C) is directly bonded to the sole material by means of an adhesive.

EXAMPLES

Having generally described this invention, a further understanding can be obtained by reference to certain specific examples which are provided herein for purposes of illustration only and are not intended to be limiting unless otherwise specified.

In the examples, "part (s)" and "%" are on the weight basis, unless otherwise specified. In the examples, the bond peel strength, fiber fineness, color difference, polymer elongation at break and polymer melting point were measured by the following methods.

Bond Peel Strength of Substrates
Test specimens: 2.5 cm in width, 23 cm in length;
Adherend plate: polyurethane type rubber plate, 3.0 cm in width, 5.0 cm in length, 5.0 mm in thickness;
Adhesive: two-pack type polyurethane-based adhesive;
Preparation of test specimens: The adhesive is applied to the test specimen and to the adherend plate and, after predrying, the specimen and adherend are laid on each other, and the whole is pressed and cured at 25° C. for 24 hours and then subjected to measurement.
Testing apparatus: Shimadzu autograph, rate of pulling 100 mm/min, chart speed 50 mm/mm;
Judgment: The first maximum peak and minimum peak are excluded, 5 largest values (Ma 1, Ma 2, Ma 3, Ma 4, Ma 5) are selected from among the maximum peaks and 5 smallest values (Mi 1, Mi 2, Mi 3, Mi 4, Mi 5) from among the minimum values, and the mean value of the 1 0 values is calculated.
Bond peek strength (kg/2.5 cm)=(Ma 1+Ma 2+Ma 3+Ma 4+Ma 5+Mi 1+Mi 2+Mi3+Mi4+Mi 5)/10.

Bond Peel Strength of Shoes
The sole and raw material are cut to a width of 2.5 cm at the toe cap portion of the shoe, the sole is bonded to the rubber plate with the adhesive, and the bond peel strength of the sole and raw material is measured in the same manner as mentioned above.

Fineness of Ultrafine Fibers

When the fiber is an ultrafine fiber-generating fiber (i.e. bundle of ultrafine fibers), a photomicrograph is taken of the fiber bundle section, ultrafine fibers constituting the fiber bundle are counted, and the fineness is calculated by dividing the thickness (in decitex) of the bundle of ultrafine fibers by the number of ultrafine fibers. When the fiber is other than a ultrafine fiber bundle, 50 fibers are randomly selected from a photo of the section of the substrate layer, the finesses of the individual fibers selected are determined from the respective sectional areas, they are added up and, finally, the sum is divided by the number of fibers.

Color Difference

The apparatus Kurabo CCM, product of Kurabo Industries Ltd. is used and Hunter's color difference formula is employed.

The appearance was evaluated by the inventors taking into consideration the hand touch, gloss and other factors on a four-stage scale from good to defective. The evaluation results of the hand touch are expressed in terms of 1 (poor), 2 (moderately poor), 3 (good), 4 (very good), and 5 (excellent). The evaluation results of the shoe softness are expressed in terms of ☺ (good), ○, Δ and X (defective).

The shoe upper appearance is expressed in terms of nubuck, grained and velour.

Polymer Elongation at Break

The polymer is melted and molded into 10-mm-wide dumbbell specimens and these are pulled at both ends on a Shimadzu autograph tensile tester and the tensile elongation at break is determined.

Polymer Melting Point

The method of JIS K 2235 is used.

Production Example 1

Nylon-6 and polyethylene, both in chip form, were blended in a ratio of 50:50 by weight and the mixture was melt-spun using an extruder. The thus-spun fiber having a sea-island structure (polyethylene being the sea component and nylon-6 being the island component) was stretched, crimped and cut to give short fibers having a thickness of 4 decitex and a length of 51 mm. The island component had an average fineness of 0.0002 decitex. Using these fibers, a cross lap was made on a webber and subjected to needle punching at a density of 700 punches /cm$^2$ on a needle punching machine to give an entangled nonwoven fabric. This entangled nonwoven fabric had a weight of 540 g/m$^2$. This fibrous sheet was impregnated with a solution of a polyethylene adipate/polyethylene glycol copolymer-based polyurethane resin in dimethylformamide (DMF) and, after wet coagulation, the sea component of the fibers, i.e. polyethylene, was extracted with toluene, to give a substrate (1) having a weight of 450 g/m$^2$ and a thickness of 1.3 mm. The polyurethane resin-fiber ratio was 40/60. The bond peel strength of this substrate was measured and found to be 5.7 kg/2.5 cm.

Production Example 2

A bicomponent fiber was produced using a spinning machine for producing bicomponent 15-island fibers by melting two polymers differing in melt flow characteristics in separate melting systems, forming a mixed system including both polymers by repeating uniting and separation thereof and spinning the mixed system. Thus, 35 parts of polyethylene was charged into the sea component side and 65 parts of nylon-6 into the other island component side, and a raw fiber with a mean fineness of 10 decitex was obtained. This raw fiber was stretched, crimped and cut to give short fibers having a thickness of 4 decitex and a length of 51 mm. The thickness of the sea component was 0.17 decitex. Using these short fibers, a cross lap was made on a webber and subjected to needle punching at a density of 700 punches /cm$^2$ on a needle punching machine to give an entangled nonwoven fabric. This fibrous sheet was impregnated with a solution of a polyethylene adipate/polyethylene glycol copolymer-based polyurethane resin in DMF and, after wet coagulation, the sea component of the fibers, i.e. polyethylene, was extracted with toluene at 80° C., to give a substrate (2) having a weight of 450 g/m$^2$ and a thickness of 1.3 mm. The polyurethane resin-fiber ratio was 20/80. The bond peel strength was 12.3kg/2.5 cm.

Production Example 3

Nylon-6 fibers having a fineness of 2 decitex and a fiber length of 51 mm and polyester fibers having a fineness of 2 decitex and a fiber length of 51 mm were blended up in a mixing ratio of 50:50 and the blend was opened on a card and then made into a web on a cross-lap webber and the web was subjected to needle punching alternately from both sides at a density of 600 punches /cm$^2$. This nonwoven fabric was impregnated with a silicone oil emulsion and then dried to give a nonwoven fabric with a weight of 325 g/m$^2$. This fiber-entangled nonwoven fabric was impregnated with a 12% solution of a polyester/polyether type polyurethane in DMF, the polyurethane was then coagulated in a 10% aqueous solution of DMF and the nonwoven fabric was dried to give a substrate (3) having a thickness of 1.3 mm and a weight of 442 g/m$^2$. The peel strength of this substrate was measured and found to be 13.0 kg/2.5 cm.

Example 1

The substrate (1) prepared in Production Example 1 was divided into two equal sections by slicing in the thickness direction, the thickness of each section was adjusted by buffing the sliced surface using a buffing machine, and the surface opposite to the sliced surface was raised using a No. 400 sandpaper, to give a sheet having a thickness of 0.5 mm and a weight of 183 g/m$^2$. This sheet was dyed under the conditions given below and, after drying, subjected to brushing treatment to give a brown suede-like substrate (1A).

| Dye composition | |
|---|---|
| Lanyl Brown BG (Sumitomo Chemical Co., Ltd.) | 4% owf |
| Irgalan Brown 2RL (Ciba-Geigy Japan Ltd.) | 1% owf |
| Leveran NK-D (Nikko Chemical Co., Ltd.) | 2 g/L |
| Dyeing time 60 minutes at 90° C. | |

Separately, a 0.8-mm-thick substrate (2A) was prepared by buffing one surface of the substrate (2) obtained in Production Example 2. Then, using a 140-mesh gravure roll, a 8% solution of a polyester-derived polyurethane in DMF was applied to the surface not treated by buffing (coating weight (on the resin solids basis) : 5 g/m$^2$) and, immediately after application, the coated surface was laid on the back side of the substrate (1A), and the both were pressed and then dried in a drier at 100° C., to give a suede-like shoe upper material A. The peel strength of the surface of this shoe upper material was measured and found to be 5. 9 kg/

2.5 cm. This shoe upper material was sewed and roughly shaped into the form of a shoe with the substrate (1A) directed to the outside, and then mounted on a last and that peripheral portion of the shoe upper material A directed toward the sole side was lifted up and placed on the peripheral bottom portion of an insole fixedly placed on the last and adhered thereto. That portion of the shoe upper mounted on the last which was to be bonded to the sole was subjected to shaving treatment using a shaver/abrader so as to shave off the substrate layer (1A) of the shoe upper material, together with the adhesive layer, to thereby-substantially expose the substrate (2). A polyurethane-based adhesive was applied to the abraded portion and the sole-shaped material and the abraded portion and sole-shaped material were bonded together to give an artificial leather shoe. The bond peel strength of the toe cap of this shoe was measured and found to be 12.4 kg/2.5 cm.

Example 2

The same brown substrate (1A) as used in Example 1 was prepared for -use as the substrate layer (A), and a 0.8-mm-thick substrate (3B) was prepared for use as the substrate layer (C) by abrading the substrate (3) prepared in Production Example 3. The unabraded side of the substrate (3B) was bonded to the brown substrate (1A) using a two-pack type polyurethane adhesive having the composition given below by means of a comma coater, to give a 1.3-mm-thick shoe upper material B. The amount of the adhesive layer applied was 8 g/m$^2$ on the resin solids basis. The peel strength of this was 5.8 kg/2.5 cm. Using this shoe upper material, shoemaking was carried out in the same manner as in Example 1 to give a shoe giving a sensation of fullness. The peel strength of the toe cap portion of this shoe was measured and found to be 15.3 kg/2.5 cm.

Example 3

The same brown substrate (1A) as used in Example 1 was prepared for use as the substrate layer (A), and a substrate (3D) was prepared for use as the substrate layer (C) by abrading the substrate (3) prepared in Production Example 3 to a thickness of 0.8 mm and dyeing this with an acid dye to the same brown color as the substrate (1A) using a circular dyeing apparatus. The substrate (A) and substrate (3D) were bonded together in the same manner as in Example 2 except that a white pigment was added to the adhesive, to give a nubuck like shoe upper material C with the top and bottom surfaces being similar in color. The surface peel strength of this shoe upper material was measured and found to be 5.6 kg/2.5 cm. For measuring the color difference between the substrate layer (A) or substrate layer (C) and the adhesive layer (B), the substrate (3D) was coated with the adhesive, followed by drying without bonding to the substrate A. The subsequent color difference measurements revealed that each color difference was ΔE=3.5. This shoe upper material was used in shoemaking in the same manner as in Example. The sole-contacting portion was shaved until removal of the adhesive layer while confirming the color difference from the adhesive layer (B). Then, the shoe upper was bonded to the sole. The peel strength of the toe cap portion of this shoe was measured and found to be 11.8 kg/2.5 cm.

Example 4

Dry layer formation was carried out on the surface of the substrate 1A used in Example 1 using a TOP layer composition and an adhesive each specified below under the conditions given below. The subsequent softening treatment for providing a silicone type softening agent using a softening agent gave a brown, sheep skin-like grained artificial leather substrate (1B). Using this substrate (1B) as the substrate layer (A), and using the other substrate layer (C) and adhesive layer (B) prepared in the same manner as in Example 3, the procedure of Example 3 was followed to give a 1.33-mm-thick grained artificial leather.

| Top layer formation method | |
| --- | --- |
| Release paper DE-123 (product of Dainippon Printing Co., Ltd. | |
| TOP layer composition | |
| Resamine ME-8115LP | 100 parts |
| (product of Dainichi Seika Color & Chemicals Mfg. Co., Ltd. | |
| MEK (methyl ethyl ketone) | 25 parts |
| DMF | 25 parts |
| Seikaseven DUT-4891 | 20 parts |
| (product of Dainichi Seika Color & Chemicals Mfg. Co., Ltd.) | |
| Coating weight | 110 g/m$^2$ |
| Drying | 90° C. |

| Adhesive layer | |
| --- | --- |
| Resamine UD 8310 | 100 parts |
| (product of Dainichi Seika Color & Chemicals Mfg. Co., Ltd. | |
| DMF | 50 parts |
| Resamine NE crosslinking agent | 12 parts |
| (product of Dainichi Seika Color & Chemicals Mfg. Co., Ltd. | |
| Resamine UD 103 | 8 parts |
| (product of Dainichi Seika Color & Chemicals Mfg. Co., Ltd. | |
| Coating weight | 110 g/m$^2$ |
| Drying | 70° C. |

The surface peel strength of this artificial leather was 6.5 kg/2.5 cm. Using this raw material, shoemaking was conducted in the same manner as in Example 3. The shaving of the portion to be bonded to the sole was conducted by removing the substrate layer (A) and adhesive layer (B) until partial removal of the substrate layer (C). Then, the substrate layer (C) was bonded to the sole to give a shoe. The bond strength of the toe cap portion of this shoe was 12.0 kg/2.5 cm.

Comparative Example 1

A 1.28-mm-thick sheet was prepared by raising the substrate (1) prepared in Production Example 1 on a buffing machine using a No 400 sandpaper. This sheet was finished by dyeing in the same manner as in Example 1 to give a brown, suede-like substrate 1E having a thickness of 1.3 mm. The peel strength of this substrate was measured and found to be 5.5 kg/2.5 cm. Using this raw material, a shoe was made. The peel strength of the toe cap portion of this shoe was only 6.5 kg/2.5 cm. This level of peel strength made it impossible to use the material in producing sports shoes.

Comparative Example 2

A 1.25-mm-thick sheet was prepared by raising one surface of the substrate (2) prepared in Production Example 2 on a buffing machine using a No. 400 sandpaper. This sheet was finished by dyeing in the same manner as in Example 1 to give a 1.3-mm-thick sheet, substrate F. The nap feel of the surface of this sheet was rough and brown velour-like. Using this sheet, the peel strength was measured and found to be 11.5 kg/2.5 cm. Using this sheet, a shoe was made in the same manner as in Example 1. The shoe had a rough and velour-like surface feel. The peel strength of the toe cap portion of this shoe was measured and found to be 11.9 kg/2.5 cm.

Comparative Example 3

The substrate (3) used in Production Example 3 was abraded using a buffing machine to a thickness of 1.2 mm and dry top layer formation was carried out in the same manner as in Example 4 while using a release paper on the other side. The subsequent mechanical crumpling gave a brown artificial leather sheet, substrate G. Using this material, the bond peel strength was measured and found to be 11.9 kg/2.5 cm. Using this material, shoemaking was carried out. The peel strength of the toe cap portion of the shoe thus obtained was 12.6 kg/2.5 cm. Therefore, this bond peel strength allowed the use of the material in making sports shoes but the shoes obtained were hard and far from indicative of high quality.

The performance characteristics of the artificial leather shoes obtained in the above examples and comparative examples are shown below.

Example 6

A mixture of 50 parts of Paraffin Wax 155 (product of Nippon Seiro) with a melting point of 69° C. and an elongation at break of 0.1% and 50 parts of Synthetic Wax No. 617 (product of Allied Chemical) with a melting point of 109° C. and an elongation at break of 0.1% was placed in a warmable vessel and heat to 130° C. and the resulting melt was applied to the surface of the substrate (1A) of the suede-like shoe upper material A produced in Example 1 using a 200-mesh gravure roll heated to the same temperature to a coating weight of 25 g/m$^2$, followed by crumpling treatment using a dry crumpling machine. Using this fibrous sheet, a shoe with the same shape as that of Example 5 was made and subjected to the same heat treatment as in Example 5. The shoe obtained had a good appearance with the effect of light and dark being more emphasized than the shoe of Example 6.

Example 7

Like in Example 5, a synthetic wax emulsion (Brian TW-86, product of Matsumoto Yushi Seiyaku) with a melting point of 103° C. and an elongation at break of 0.5% was applied by spraying to the surface of the substrate (1A) of the suede-like shoe upper material produced in Example 1 at a dose of 10 g/m$^2$, followed by crumpling treatment using a dry crumpling machine. The leather-like sheet material obtained had a good appearance with a great contrast

TABLE 1

| Item | | Example 1 | Example 2 | Example 3 | Example 4 | Comp. Example 1 | Comp. Example 2 | Comp. Example 3 |
|---|---|---|---|---|---|---|---|---|
| Constitution | Layer (A) | Substrate 1A | Substrate 1A | Substrate 1A | Substrate 1B | Substrate 1E | Substrate F | Substrate G |
| | Layer (C) | Clear dot-like application | Clear coat layer | White coat layer | White coat layer | | | |
| | Layer (B) | Substrate 2A | Substrate 3B | Substrate 3D | Substrate 3D | | | |
| Shoe Upper appearance | | Nubuck | Nubuck | Nubuck | Grained | Nubuck | Velour | Grained |
| Hand touch | | 5–4 | 4 | 5–4 | 4 | 5 | 4 | 2 |
| Thickness (mm) | | 1.30 | 1.30 | 1.30 | 1.33 | 1.30 | 1.30 | 1.30 |
| Shoe upper peel strength (kg/2.5 cm) | | 5.9 | 5.8 | 5.6 | 6.5 | 5.5 | 11.5 | 11.9 |
| Shoe softness | | ◯ | ◯ | ◯ | ◯ | ◎ | Δ | X |
| Toe cap peel strength (kg/2.5 cm) | | 11.4 | 12.3 | 11.8 | 12.0 | 6.5 | 11.9 | 12.6 |

Example 5

A synthetic wax (FT-100; product of Shell MDS) with a melting point of 106° C. and an elongation at break of 0.1% was placed in a warmable bath and heated to 130° C. and the melt was applied to the surface of the substrate (1A) of the suede-like shoe upper material prepared in Example 1 using a 200-mesh gravure roll heated to the same temperature to a coating weight of 30 g/m$^2$, followed by crumpling treatment using a dry crumpling machine.

The crumpled leather-like sheet showed a very good appearance with a high level of contrast between the portions now appearing dark in color as a result of crumpling and the portions showing no such appearance. Using this fibrous sheet, a trekking shoe was produced. When this shoe was placed in a drier, through which hot air was passed from above, at 110° C. for 5 minutes, the shoe upper and upper heel portions became pale brown and the toe cap, arch and lower heel portions became dark brown, producing a three-dimensional effect, hence give a very good appearance.

between light and dark. Using this fibrous material, a shoe with the same shape as that of Example 1 was made and subjected to the same heat treatment as in Example 5. The shoe obtained had a good appearance with a contrast between light and dark found at the same sites as in Example 5.

The invention can provide an artificial leather shoes having a sufficient level of peel strength as required of shoes by using an shoe upper material so far incapable of being used because of its being low in peel strength in spite of its being excellent in softness and fashionability and having a quality appearance, without impairing the good characteristics thereof. Further, by providing the surface of the leather like sheet material with an effect of light and dark in color by providing the surface with a specific polymer, it becomes possible to render the sheet material more close in appearance to natural leathers. Further, by making shoes using the artificial leather and unevenly providing the shoes with heat, it becomes possible to render the shoes excellent in three-dimensional effect.

This application is based on Japanese Patent Application Nos. 5730/2000, filed Jan. 6, 2000, 215680/2000, filed Jul. 17, 2000, and 257603/2000, filed Aug. 28, 2000, the entire contents of each of which being hereby incorporated by reference, the same as if set forth at length.

Having now fully described this invention, it will be apparent to one of ordinary skill in the art that many changes and modifications can be made thereto without departing from the spirit or scope of the invention as set forth herein.

What is claimed is:

1. An artificial leather shoe, comprising:
   a shoe upper and a shoe sole; wherein
   said shoe upper comprises, in order:
   (A) a substrate layer having an inner surface and at least an outer surface and comprising:
      an entangled nonwoven first fabric comprising ultrafine fibers having a fineness of not more than 0.01 decitex; and
      a first elastomeric polymer impregnated in said first fabric;
   (B) an adhesive layer; and
   (C) a substrate layer, comprising:
      an entangled nonwoven second fabric comprising fibers having a fineness of not less than 0.05 decitex; and
      a second elastomeric polymer impregnated in said second fabric;
   wherein said outer surface of said substrate layer (A) forms an exterior surface of said shoe upper;
   wherein said shoe sole is fixedly bonded to a portion of said shoe upper with an adhesive;
   wherein, at said portion of said shoe upper that is fixedly bonded to said shoe sole, said substrate layer (A) and said adhesive layer (B) have been substantially removed such that said substrate layer (C) is directly bonded to said shoe sole with said adhesive.

2. The artificial leather shoe according to claim 1, wherein said outer surface of said substrate layer (A) is at least a partially napped outer surface, and wherein at least a portion of said napped outer surface is covered with a third polymer, said third polymer being solid at a temperature of 20–25° C. and having a melting point not lower than 60° C. and having an elongation at break of not more than 10%.

3. The artificial leather shoe according to claim 1, wherein said outer surface of said substrate layer (A) is at least partially napped or is at least partially covered with a macromolecular elastomer.

4. The artificial leather shoe according to claim 2, wherein at least a portion of said napped outer surface comprises napping fibers, said napping fibers comprising a portion of said ultrafine fibers covered with said third polymer.

5. The artificial leather shoe according to claim 3, wherein said napped outer surface further comprises a plurality of light and dark areas.

6. The artificial leather shoe according to claim 5, wherein said light and dark areas are produced by unevenly heating said outer surface such that site-dependent differences arise in the state of occurrence of said third polymer.

7. The artificial leather shoe according to claim 4, wherein said portion of said napped surface has a whitish appearance due to an interfacial separation of said third polymer from ultrafine fibers or due to a cracking of said third polymer.

8. The artificial leather shoe according to claim 1, wherein said ultrafine fibers in said entangled nonwoven first fabric comprise polyamide fiber bundles.

9. The artificial leather shoe according to claim 1, wherein a bond peel strength of said substrate (C) is not less than 7.0 kg/25 cm.

10. The artificial leather shoe according to claim 1, wherein a ratio of a bond peel strength of said substrate layer (C) to a bond peel strength of said substrate layer (A) is not less than 1.5.

11. The artificial leather shoe according to claim 1, wherein a color difference $\Delta E_A$ between substrate layer (A) and said adhesive layer (B) is not less than 2.0.

12. The artificial leather shoe according to claim 1, wherein a color difference $\Delta E_C$ between said substrate layer (C) and said adhesive layer (B) is not less than 2.0.

13. The artificial leather shoe according to claim 1, wherein said fibers in said substrate layers (A) and (C), respectively, may comprise the same or different materials, and independently of one another comprise at least one fiber-forming polymer selected from the group consisting of aromatic polyester, polyethylene terephthalate, polybutylene terephthalate, polyamide, nylon-6, nylon-66, nylon-610, polyolefin, polyethylene, polypropylene, and combinations thereof.

14. The artificial leather shoe according to claim 1, said fibers in said substrate layers (A) and (C), respectively, may comprise the same or different materials, and independently of one another is obtained from one or more fibers having a sea-island structure wherein an island component is a polyester or polyamide, and a sea component is at least one polymer selected from the group consisting of polyethylene, polypropylene, ethylene-propylene copolymer, ethylene-vinyl acetate copolymer, polystyrene, styrene-acrylic monomer copolymer; styrene-ethylene copolymer, and combinations thereof.

15. The artificial leather shoe according to claim 1, wherein said first and second elastomeric polymers may be the same or different, and each may independently comprise a polymer selected from the group consisting of polyurethane, segmented polyurethane, and combinations thereof.

16. The artificial leather shoe according to claim 1, wherein said first and second elastomeric polymers may be the same or different, and each may independently comprise a segmented polyurethane comprising the reaction product of a polymer diol having a number average molecular weight of 500 to 5,000 as a soft segment, a diisocyanate compound and a low-molecular weight chain extender.

17. The artificial leather shoe according to claim 1, wherein said first and second elastomeric polymers may be the same or different, and each may independently comprise one or more selected from the group consisting of pigment, dye, coagulation adjusting agent, stabilizer, and combinations thereof.

18. The artificial leather shoe according to claim 1, wherein a respective weight ratio of the fibers in said first fabric or said second fabric to said first elastomeric polymer or said second elastomeric polymer may be the same or different, and is independently within the range of 90/10 to 20/80.

19. The artificial leather shoe according to claim 1, wherein said substrate layer (A) has a thickness of 0.2 to 2.0 mm and a weight of 60 to 600 g/m$^2$.

20. The artificial leather shoe according to claim 1, wherein said substrate layer (C) has a thickness of 0.5 to 3.0 mm and a weight of 100 to 1,000 g/m$^2$.

21. The artificial leather shoe according to claim 1, wherein a thickness ratio of said substrate layer (A) and said substrate layer (C) is within the range of 1:1 to 1:10.

22. The artificial leather shoe according to claim 1, wherein said adhesive layer (B) comprises one or more resins selected from the group consisting of polyurethane resin, polyamide resin, polyester resin, polyacrylic resin, natural rubber, synthetic rubbers, and combinations thereof.

23. A method of making an artificial leather shoe, comprising:
bonding a portion of a shoe upper to a shoe sole together with an adhesive;
wherein said shoe upper comprises, in order:
(A) a substrate layer having an inner surface and at least an outer surface and comprising:
an entangled nonwoven first fabric comprising ultrafine fibers having a fineness of not more than 0.01 decitex; and
a first elastomeric polymer impregnated in said first fabric;
(B) an adhesive layer; and
(C) a substrate layer, comprising:
an entangled nonwoven second fabric comprising fibers having a fineness of not less than 0.05 decitex; and
a second elastomeric polymer impregnated in said second fabric;
wherein said outer surface of said substrate layer (A) forms an exterior surface of said shoe upper;
wherein, prior to bonding said portion of said shoe upper to said shoe sole together, said substrate layer (A) and said adhesive layer (B) are substantially shaved off in said portion of said shoe upper such that said substrate layer (C) is directly bonded to said shoe sole.

24. The method according to claim 23, wherein said outer surface of said substrate layer (A) is at least a partially napped outer surface, and wherein at least a portion of said napped outer surface is covered with a third polymer, said third polymer being solid at a temperature of 20–25° C. and having a melting point not lower than 60° C. and having an elongation at break of not more than 10%.

25. The method according to claim 23, wherein said outer surface of said substrate layer (A) is at least partially napped or is at least partially covered with a macromolecular elastomer.

26. The method according to claim 24, wherein at least a portion of said napped outer surface comprises napping fibers, said napping fibers comprising a portion of said ultrafine fibers covered with said third polymer.

27. The method according to claim 26, wherein said napped outer surface further comprises a plurality of light and dark areas.

28. The method according to claim 27, wherein said light and dark areas are produced by unevenly heating said outer surface such that site-dependent differences arise in the state of occurrence of said third polymer.

29. The method according to claim 26, wherein said portion of said napped surface has a whitish appearance due to an interfacial separation of said third polymer from ultrafine fibers or due to a cracking of said third polymer.

30. The method according to claim 23, wherein said ultrafine fibers in said entangled nonwoven first fabric comprise polyamide fiber bundles.

31. The method according to claim 23, wherein a bond peel strength of said substrate (C) is not less than 70 kg/2.5 cm.

32. The method according to claim 23, wherein a ratio of a bond peel strength of said substrate layer (C) to a bond peel strength of said substrate layer (A) is not less than 1.5.

33. The method according to claim 23, wherein a color difference $\Delta E_A$ between said substrate layer (A) and said adhesive layer (B) is not less than 2.0.

34. The method according to claim 23, wherein a color difference $\Delta E_C$ between said substrate layer (C) and said adhesive layer (B) is not less than 2.0.

35. The method according to claim 23, wherein said fibers in said substrate layers (A) and (C), respectively, may comprise the same or different materials, and independently of one another comprise at least one fiber-forming polymer selected from the group consisting of aromatic polyester, polyethylene terephthalate, polybutylene terphthalate, polyamide, nylon-6, nylon-66, nylon-610, polyolefin, polyethylene, polypropylene, and combinations thereof.

36. The method according to claim 23, said fibers in said substrate layers (A) and (C), respectively, may comprise the same or different materials, and independently of one another is obtained from one or more fibers having a sea-island structure wherein an island component is a polyester or polyamide, and a sea component is at least one polymer selected from the group consisting of polyethylene, polypropylene, ethylene-propylene copolymer, ethylene-vinyl acetate copolymer, polystyrene, styrene-acrylic monomer copolymer, styrene-ethylene copolymer, and combinations thereof.

37. The method according to claim 23, wherein said first and second elastomeric polymers may be the same or different, and each may independently comprise a polymer selected from the group consisting of polyurethane, segmented polyurethane, and combinations thereof.

38. The method according to claim 23, wherein said first and second elastomeric polymers may be the same or different, and each may independently comprise a segmented polyurethane comprising the reaction product of a polymer diol having a number average molecular weight of 500 to 5,000 as a soft segment, a diisocyanate compound and a low-molecular weight chain extender.

39. The method according to claim 23, wherein said first and second elastomeric polymers may be the same or different, and each may independently comprise one or more selected from the group consisting of pigment, dye, coagulation adjusting agent, stabilizer, and combinations thereof.

40. The method according to claim 23, wherein a respective weight ratio of the fibers in said first fabric or said second fabric to said first elastomeric polymer or said second elastomeric polymer may be the same or different, and is independently within the range of 90/10 to 20/80.

41. The method according to claim 23, wherein said substrate layer (A) has a thickness of 0.2 to 2.0 mm and a weight of 60 to 600 g/m².

42. The method according to claim 23, wherein said substrate layer (C) has a thickness of 0.5 to 3.0 mm and a weight of 100 to 1,000 g/m².

43. The method according to claim 23, wherein a thickness ratio of said substrate layer (A) and said substrate layer (C) is within the range of 1:1 to 1:10.

44. The method according to claim 23, wherein said adhesive layer (B) comprises one or more resins selected from the group consisting of polyurethane resin, polyamide resin, polyester resin, polyacrylic resin, natural rubber, synthetic rubbers, and combinations thereof.

* * * * *